UNITED STATES PATENT OFFICE.

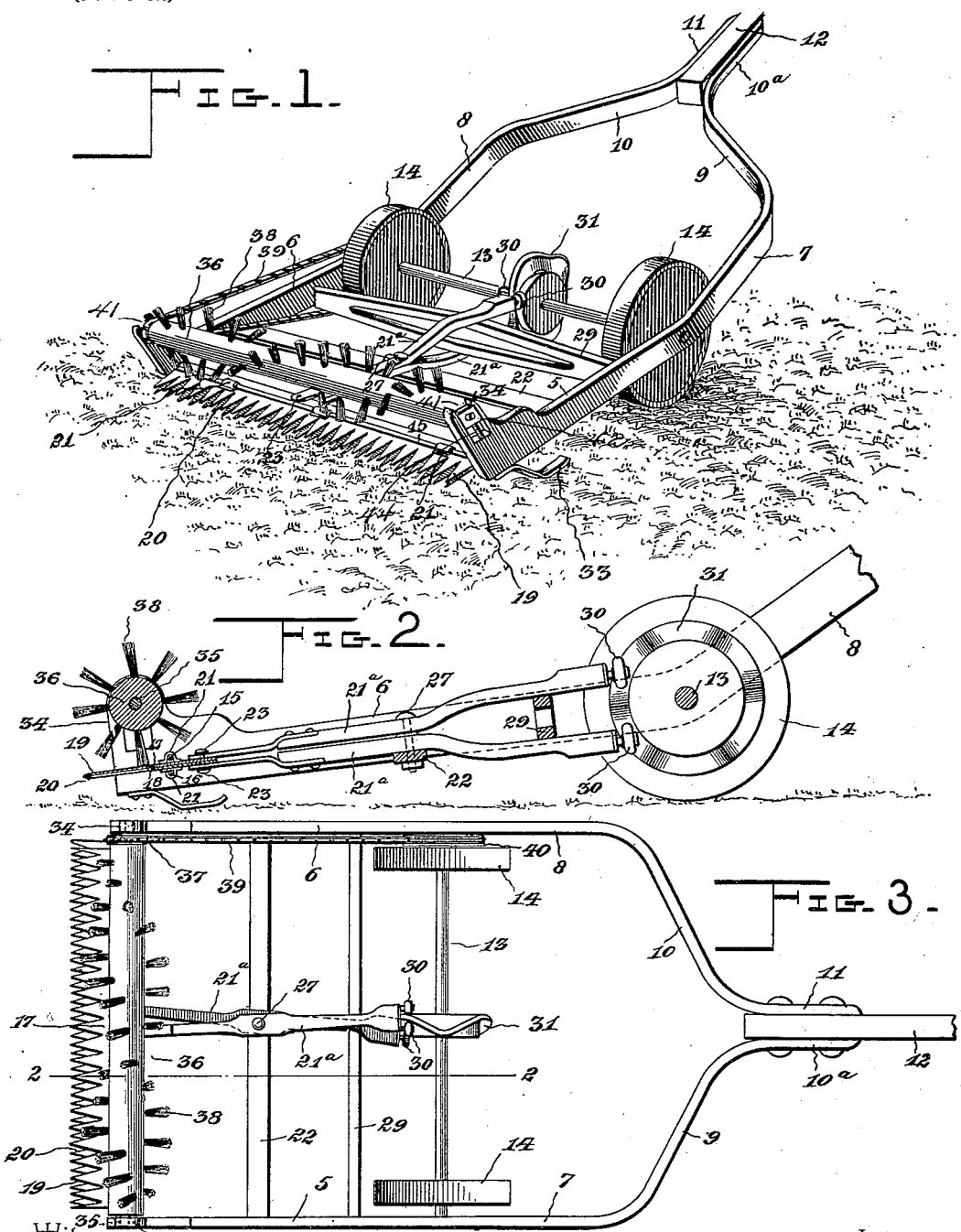

JERRY STAIR, OF PIPESTONE, MINNESOTA.

LAWN-MOWER.

SPECIFICATION forming part of Letters Patent No. 648,600, dated May 1, 1900.

Application filed August 19, 1899. Serial No. 727,843. (No model.)

*To all whom it may concern:*

Be it known that I, JERRY STAIR, a citizen of the United States, residing at Pipestone, in the county of Pipestone and State of Minnesota, have invented a new and useful Lawn-Mower, of which the following is a specification.

This invention relates to lawn-mowers, and has for one object to provide a device of this nature in which there will be an efficient cutting of the grass on a constant level and in which the grass as cut will be thrown backwardly over the cutter-bars and out of the way, so as not to interfere with the operation of the machine by clogging the working parts thereof.

A further object of my invention is to provide, in combination with the above features, a simple and reliable mechanism for reciprocating the knives in a manner to positively engage the grass and insure its cutting.

In the drawings forming a portion of this specification, and in which like numerals of reference indicate similar parts in the several views, Figure 1 is a front perspective view of a lawn-mower constructed in accordance with my invention. Fig. 2 is a section on line 2 2 of Fig. 3. Fig. 3 is a plan view of my mower.

Referring now to the drawings, in operating in accordance with my invention I provide a frame consisting of side pieces 5 and 6, which are arranged parallel and from their rear ends are extended upwardly, as at 7 and 8, at an obtuse angle to the parts 5 and 6, are then curved inwardly, as at 9 and 10, and are finally extended rearwardly, as at $10^a$ and 11 and separated by an interspace in which is located a suitable handle 12, secured in place in any suitable manner. Transversely of the forward ends of the sides 5 and 6 are supporting-rods 15 and 16, arranged one above the other and separated by an interspace in which are arranged mutually-engaging cutter-bars 17 and 18, carrying knives 19 and 20, adapted for reciprocatory motion with respect to each other upon their respective supporting-rods. Each knife is of substantially V shape, as in the usual form of reciprocatory mowers, and the cutter-bars are slidably connected with their respective supporting-rods by means of straps 21, passed over the rods and secured at their ends to the bars.

In order to reciprocate the cutter-bars and their knives, I connect with each bar the forward end of an operating-lever, which lever is connected with the cutter-bar by means of a pivot-pin 23, passed through a longitudinal slot in the lever and into engagement with the cutter-bar, thus allowing the movement of the adjacent end of the lever in an arc without drawing the cutter-bar rearwardly, as will be readily understood.

The levers $21^a$, above referred to, extend rearwardly from the cutter-bars and on one side of a cross-piece 22, having its ends fixed to the sides 5 and 6 of the frame, said levers being pivotally connected with the cross-piece through the medium of a common pivot-pin 27, as shown. From the pivot-pin 27 the levers $21^a$ diverge rearwardly and engage and lie on opposite sides of a second cross-piece 29, having its ends likewise connected with the sides of the frame. Each lever $21^a$ has at its rear end two rollers 30, pivotally mounted side by side and separated by an interspace adapted to receive the outer edge of a cam-plate 31, which cam-plate is mounted upon a hub fixed to the shaft 13 and is adapted to turn with the supporting-wheels 14 of the machine. The curvature of the cam-plate is such that the engaging ends of the levers will be moved in opposite directions as the plate is rotated, resulting in a similar correlative movement of the forward ends of the levers and a consequent mutual reciprocation of the cutter-bars and their knives.

In order to hold the knives at a constant elevation with respect to the ground over which they are passed, I connect downwardly and rearwardly directed shoes 33 to the under sides of the forward ends of the sides 5 and 6, which shoes engage the ground and support the forward end of the frame, with the mechanism carried thereby.

The forward ends of the sides 5 and 6 are provided with upwardly-extending ears 34, having slots 41 therein. In these slots 41 are slidably-disposed bearing-blocks 42, adapted for adjustment in the slots by means of screws 44, entering threaded openings in the blocks and the bases of the recesses. In these blocks is journaled a shaft 35, carrying a roller 36, carrying radially-extending and helically-disposed brush-tufts 38, held at an elevation to engage the upper surfaces of the knives and brush the cut grass rearwardly thereof to prevent clogging of the mechanism. The roller 36 is rotated through the medium of a sprocket 37, carried at one end of the shaft 35, and upon which is mounted a sprocket-chain 39, extending to a second sprocket 40, carried by the shaft 13. Thus as the machine is pushed forwardly the under side of the roller 36 will move rearwardly of the cutter-bar and knives and will engage the cut grass and carry it rearwardly and deposit it within the inclosure of the frame of the machine.

Having thus described my invention, what I claim is—

In a mowing-machine, the combination with a frame comprising side pieces having their forward ends projected upwardly, said plates extending inwardly and rearwardly and having a handle connected thereto, parallel rods having their ends fixed in the side pieces, blocks slidably mounted upon the rods, cutting-knives fixed to the blocks, cross-pieces connected with the frame, levers mounted on the cross-pieces and pivotally connected with the knives, said levers having rollers at their rear ends, an axle mounted in the frame and having supporting-wheels, a cam-wheel upon the axle and lying between the rollers of the levers to oscillate the levers, a sprocket-wheel upon the axle, a shaft adjustably mounted upon the upwardly-projected forward ends of the frame and provided with a brush, a sprocket-wheel mounted upon said shaft, and a chain connecting the sprocket-wheels.

In testimony that I claim the foregoing as my own I have hereto affixed my signature in the presence of two witnesses.

JERRY STAIR.

Witnesses:
L. R. OBER,
E. T. SHIPLEY.